Figure 1:
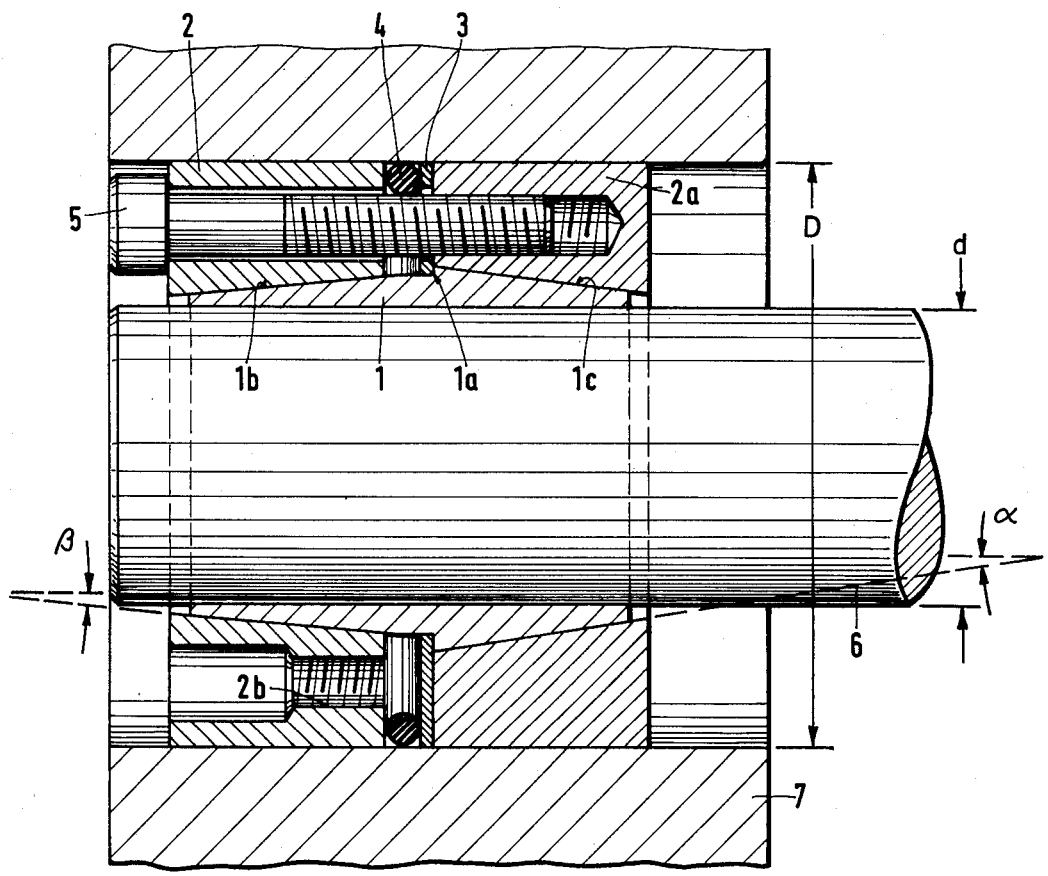

United States Patent [19]
Peter et al.

[11] 3,990,804
[45] Nov. 9, 1976

[54] DOUBLE CONICAL HUB-TO-SHAFT CONNECTION

[75] Inventors: Oskar Erich Peter, Brackenheim; Lothar Peter, Guglingen, both of Germany

[73] Assignee: Oskar Erich Peter, Brackenheim, Germany

[22] Filed: June 19, 1975

[21] Appl. No.: 588,585

[30] Foreign Application Priority Data
Oct. 29, 1974 Germany............................ 2451311

[52] U.S. Cl................................ 403/370; 403/374
[51] Int. Cl.²....................... B25G 3/20; F16B 2/00; F16B 7/04
[58] Field of Search ........... 403/366, 370, 371, 373, 403/374

[56] References Cited
UNITED STATES PATENTS

| | | | |
|---|---|---|---|
| 2,760,800 | 8/1956 | Wekeman | 403/366 |
| 3,679,247 | 7/1972 | Peter | 403/366 |
| 3,717,367 | 2/1973 | Peter et al. | 403/366 |
| 3,847,493 | 11/1974 | Peter | 403/370 |
| 3,847,495 | 11/1974 | Peter | 403/366 |
| 3,849,015 | 11/1974 | Peter | 403/370 |

FOREIGN PATENTS OR APPLICATIONS
2,204,038   1/1972   Germany ............................ 403/370

*Primary Examiner*—Wayne L. Shedd
*Attorney, Agent, or Firm*—Flynn & Frishauf

[57] ABSTRACT

To decrease the cost of such a connection, and increase power transmission as well as decrease stresses on the shaft, conical surfaces formed of respective inner and outer clamping rings are so arranged that one of the conical surfaces has an engagement friction relationship which provides for self-binding, whereas the other conical surface does not have self-binding engagement friction; the difference in engagement friction can be obtained by changing the cone angles, or the surface characteristics of the engaging surfaces.

15 Claims, 2 Drawing Figures

DOUBLE CONICAL HUB-TO-SHAFT CONNECTION

Cross reference to related patents:
3,656,785
3,717,367
3,679.247
3,776,651
3,847,493
3,847,495
assigned to the assignee or inventor, respectively, of the present application.

The present invention relates to a hub-to-shaft connection of the type shown, for example, in the cross-referenced U.S. Pat. No. 3,717,367, of which the inventor hereof is an inventor, and more particularly to such a connection in which double conical surfaces are used to clamp or tighten a hub to a shaft.

In the cross-referenced U.S. Pat. No. 3,717,367, two ring-shaped engagement elements are used which have matching facing double conical surfaces. The outer clamping rings, having outer cylindrical surfaces engaged by the hub, have inner conical surfaces. At their fitting inner end, these surfaces are formed with a collar, or an engagement ring which fits into a circumferential groove of the slit double conical inner clamping ring. The two conical elements of the hub-to-shaft connection are therefore connected together and, even if the conical surfaces are formed to be self-binding, they can be forced out of clamping engagement by inserting clamping screws into tapped holes in the outer conical ring, and screwing the bolts thereinto, thus pressing the outer rings away from each other. This method of releasing a conical clamp connection is also illustrated in some of the other cross-referenced patents. Special hub or shaft pulling tools thus are not necessary.

The assembly described in the aforementioned U.S. Pat. No. 3,717,367 provides a complete unit, without any loose parts which might get lost or misplaced, and is capable of transferring substantial torques. It has been found that it is comparatively difficult and expensive to form the inner collars at the inner ends of conical bores, and to form grooves fitting around the collar in the comparatively thin-walled inner clamping ring, and to so machine these collars and grooves that they will properly fit together and provide for good transfer of forces to permit high torque transmissions, while providing for essentially uniform radial stresses and precise centricity. It has been found that slitting the double conical inner ring — which has a generally cylindrical inner surface to fit around the shaft — in order to insert it beneath the surrounding collar of the outer ring may cause difficulties in the transfer of power. The shaft, around which the slit inner ring fits, can be damaged after having once been tightened, due to the substantial radial pressure, thus impairing the strength of the shaft and the operating reliability, as well as the safety of the hub-to-shaft connection. It is also difficult to obtain clamping pressures which are uniform throughout the circumference of the shaft, and hence of the hub-to-shaft connection. The slit, double conical inner ring tends to deform or damage the shaft in the region of the slit. The double conical construction, in which both conical surfaces are self-binding, may cause the shaft to be deformed at the junction of the conical surfaces by being excessively pinched so that damage to the shaft may result, causing fissures and the like which may lead to fracture of the shaft.

It is an object of the present invention to provide a hub-to-shaft connection which has all the advantages of the connections of the prior art and in which disadvantages, which have been found in use, can be avoided, in that the strength of the shaft is not impaired, and operating reliability as well as centricity are increased, while further permitting decrease in manufacturing costs.

Subject matter of the present invention: Briefly, the double conical inner ring is formed with one conical surface which is self-binding and with one conical surface which is not self-binding. It is constructed as a closed ring. Surprisingly, the strength of the shaft is not impaired, operating reliability is increased and centricity of the clamping connection is improved.

The hub-to-shaft connection, formed with double conical rings in which the inner ring has a self-binding and a non-self-binding conical surface, respectively, preferably is so arranged on the shaft that the clamping surface which has self-binding characteristics is located at the axial end of the shaft. The main radial clamping stress is thus placed toward the end zone of the shaft; stresses induced in the shaft thus are gradually dissipated in axial direction of the shaft towards the inner region thereof, and are accepted by the non-self-binding conical surface, towards the center of the hub-to-shaft connection. This arrangement effectively prevents break of the shaft even upon constant loading, and under dynamic torque transfer loading. The closed double conical inner ring, coupled with two closed outer conical rings, has the additional advantage that the hub-to-shaft connection, after tightening, is hermetically sealed. This greatly improves the torque transfer, since pressures which arise at the gap of a slit ring are avoided, thus preventing damage to the surface of the shaft and inhibiting localized stresses.

The connection in accordance with the present invention is easy to make, and thus can be manufactured inexpensively, regardless of dimensions, while maintaining extreme accuracy of centricity. Manufacture can be automated, and can be carried out on automatic lathes, or the like, the continuous closed inner and outer ring providing for uniform radial stresses between the shaft and the hub, and thus for uniform power transfer throughout the circumference of the hub and the shaft.

The radially uniform stresses of the closed, continuous double conical inner ring, located around the circumference of the shaft, and in operating engagement with the closed continuous double conical outer rings, with corresponding conical surfaces, further increases the stress distribution between the hub and the shaft as a whole, and improves centricity, even after repeated loosening and tightening of the connection, while permitting transfer of increased torques with respect to connections of the prior art.

In accordance with a feature of the invention, the inner ring is formed with a shoulder in the region of the junction of the conical surfaces; a ring disk, for example of sheet steel, is fitted against the shoulder to permit ready loosening of a clamped, tightened connection by pressing some of the clamping bolts against the steel disk. The steel disk is preferably made of hardened steel, and its presence prevents damage of the inner surfaces of the outer clamping ring which, typically, is made of softer material. The shoulder of the inner ring with the ring disk made of hardened sheet steel permits elimination of the circumferential collar, required in accordance with the prior art, in order to permit loosening of the connection without a pulling tool, thus decreasing costs of manufacture of the hub-to-shaft connection as an assembly.

In accordance with a feature of the invention, the self-binding surfaces are defined by conical angles which are self-binding, whereas the non-self-binding surfaces are formed by conical angles which are not self-binding; in accordance with another feature of the invention, the surface characteristics of the matching engaging conical surfaces are so arranged that one of them will be self-binding, and the other one will not, although the cone angles themselves may be similar. The second embodiment permits greater economy in programming of manufacturing operation at the cost, however, of differential surface treatment.

Reference is made to U.S. Pat. No. 3,679,247, of which the inventor hereof is one of the inventors, as well as to German Patent No. 1,095,064, in which closed inner and outer clamping rings are disclosed.

Figure 2:
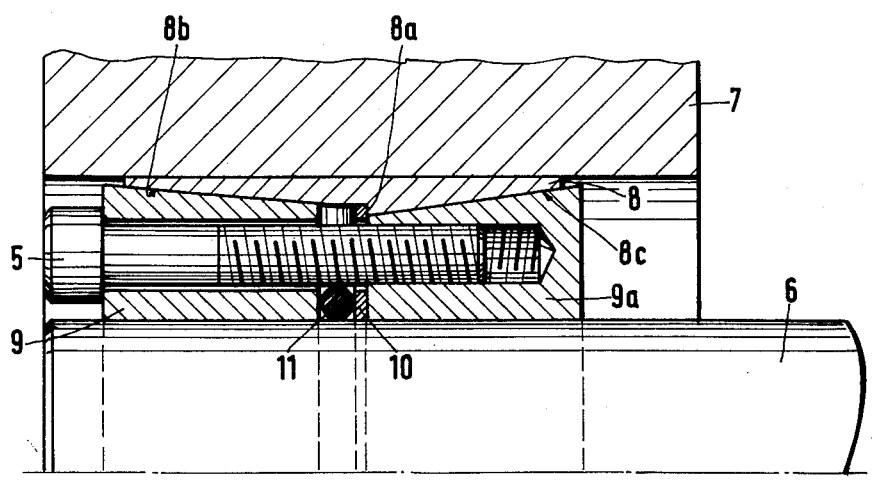

The invention will be described by way of example with reference to the accompanying drawings, wherein:

FIG. 1 is a schematic cross-sectional view of a hub-to-shaft connection with a closed double conical inner clamping ring and two outer rings, each one having an inner conical surface, and with a steel disk interposed between the outer rings, as well as a sealing element, in unstressed, nonclamped state, inserted between a hub and the shaft; and FIG. 2 is a fragmentary axial cross-sectional view of the upper half of a connection, showing a modified embodiment of the structure in accordance with the invention.

The double conical connection (FIG. 1) to connect a shaft 6 to a hub 7 includes a continuous circular inner clamping ring 1 having a self-binding outer conical surface 1b and an oppositely directed non-self-binding upper conical surface 1c. At the peak of the inner ring, that is, at the junction of the two conical surfaces, an offset shoulder 1a is formed which provides an abutment surface for a ring disk 3 made of steel, preferably hardened sheet steel, which may be formed as a punched element to permit disengagement of the connection, as will appear. Each one of the conical surfaces 1b, 1c is engaged by an inner conical surface of a respective outer ring 2, 2a. The conical surfaces match. The outer conical ring 2 is formed with tapped press-off bores 2b. A rubber O-ring 4 is located between the inner facing surface of the outer ring 2 and the steel disengagement disk 3. The rubber ring 4 locates the disk 3 in position prior to tightening and assembly of the connection. Ring disk 3 could also be secured to the outer conical ring 2a by means of screws, self-binding corrugated holding pins, or the like. Bolts 5, located in planetary position around shaft 6, and formed, for example, with Allen heads, pass through smooth bores in the outer ring 2 and are engaged in tapped bores in outer ring 2a. Upon tightening of bolts 5, the conical surfaces will be moved against each other to clamp the shaft to the hub. The cross-sectional thickness of the outer rings 2, 2a is substantially greater than that of the inner ring 1, since sufficient material must be left on both sides of the bolts 5 to provide for transfer of power, without decrease of structural strength. The shoulder 1a is located to be flush with the inner end face of ring 2a when the assembly is in loose, i.e. unclamped condition (FIG. 1).

The embodiment of FIG. 2 is essentially similar to that of FIG. 1 except that the relationship between inner and outer ring is reversed; the continuous outer ring 8 is formed with a shoulder 8a and with conical surfaces 8b, 8c fitting against the conical surfaces formed on the continuous inner rings 9, 9a. Steel disk 10 and rubber ring 11 are interposed between the inner rings 9, 9a. The assembly is held together, as before, by bolts 5, to clamp hub 7 on the shaft 6. In this construction, the inner ring is the one which is formed with the greater cross-sectional area, since it is the one to accept bolt 5.

Assembly, use and operation: Upon tightening of bolts 5, located circumferentially, in planetary position around shaft 6, the two thick-walled rings 2, 2a (or 9, 9a, respectively) are moved counter each other, so that the conical surfaces corresponding to the conical surfaces 1b, 1c (8b, 8c, respectively) are moved towards each other. The intermediate ring disk 3 likewise is moved centrally of the connection. Depending of the degree of tightening of the bolts 5, and the resulting axial forces, radial pressure will be exerted on shaft 6 and over the outer rings on the hub 7. Substantial torques can therefore be transferred between the shaft 6 and the hub 7, even under high dynamic load conditions.

In order to release the connection, the bolts 5 are loosened and some of the bolts 5 are removed and threaded into the press-off bores 2b (similar holes being provided in ring 8b, not shown, in the embodiment of FIG. 2) and the bolts 5 are tightened against the disk 3. The non-self-binding ring 2a (or, respectively, ring 9a, FIG. 2) will first move axially; thereafter, the other ring 2 (or ring 9, respectively) can be released from the binding conical surface 1b (8b, respectively) so that the entire connection can be removed from the shaft, or the hub, respectively, without requiring any additional pulling tools.

In an example, a shaft of 2.000 inches diameter was connected to a hub having an inner bore opening D of 4.000 inches, leaving radial differences of 1.000 inch at either diametrical side. The cone angle $\beta$ for the self-binding conical surface was 3°–5°. The cone angle $\alpha$ for the non-self-binding cone surface was 6°–8°.

Various changes and modifications may be made and features described in connection with one embodiment may be used with the other, within the scope of the inventive concept.

A suitable material for the single continuous ring 1, 8 is steel; a suitable material for the separate cone rings 2, 9, is steel, the surfaces of which are treated to provide for self-binding, characteristics. The hub 7 and the shaft 6 are usually forged steel.

We claim:
1. Double conical hub-to-shaft connection to connect a shaft element (6) to a hub element (7) comprising
a continuous inner ring (1) having a cylindrical inner surface seating on the shaft (6) and outer double conical surfaces (1b, 1c);
two continuous outer rings (2, 2a) having outer cylindrical surfaces seating in the hub (7) and inner conical surfaces seating, respectively, on the outer conical surfaces of the inner ring (1);
the outer rings (2, 2a) being formed with axial bores in which are received clamping bolts (5) tending to tighten the outer rings axially towards each other and thus move the conical surfaces over each other, the outer rings having greater cross-sectional area than the inner rings to accept said bores and clamping bolts (5);

the conical surfaces being of different engagement characteristics, one of said surfaces (1b) having engagement characteristics which provide for self-binding and the other of said surfaces (1c) having engagement characteristics which are non-self-binding;

a circumferential ring shoulder (1a) formed on the inner ring (1) at the junction of the conical surfaces (1b, 1c), the shoulder (1a) being approximately flush with the inner end face of one (2a) of the outer rings (2, 2a) when the connection is in unclamped condition;

and a ring-shaped disengagement disk (3) of non-yielding material located intermediate said two outer rings and seating against said shoulder and against the end face of said one outer ring (2a) said disk (3) being apertured to freely pass said bolts (5) into their engagement holes and against which the bolts thrust to disengage said rings (2, 2a).

2. Connection according to claim 1, wherein said disk is a steel disk.

3. Connection according to claim 1, wherein said disk is a hardened steel disk, seated against the outer ring having the conical surface with non-self-binding surface characteristics.

4. Connection according to claim 1, wherein the outer ring having self-binding surface characteristics is located at the axially outer end of the shaft.

5. Connection according to claim 1, wherein the cone angles of said surfaces are different, the surface with the self-binding characteristics having a self-binding cone angle ($\beta$) and the surface which is non-self-binding having a greater cone angle ($\alpha$).

6. Connection according to claim 1, wherein the friction engagement surface characteristics of said self-binding surfaces are different.

7. Connection according to claim 6, wherein the cone angles of said sufaces are similar.

8. Double conical hub-to-shaft connection to connect a shaft element (6) to a hub element (7) comprising an outer ring (8) having an outer cylindrical surface seating in the hub (7) and inner double conical surfaces (8b, 8c);

two continuous inner rings (9, 9a) having inner cylindrical surfaces seating on the shaft (6) and outer conical surfaces seating, respectively, on the inner conical surfaces of the outer ring (8);

the inner rings (9, 9a) being formed with axial bores in which are received clamping bolts (5) tending to tighten the inner rings axially towards each other and thus to move the conical surfaces over each other, said inner rings having a greater cross-sectional area than the outer rings to accept said bores and clamping bolts;

the conical surfaces being of different engagement characteristics, one of said surfaces (8b) having an engagement characteristic which provides for self-binding and the other of said surfaces (8c) having an engagement characteristic which is non-self-binding;

a circumferential ring shoulder (8a) formed on the outer ring (8) at the junction of the conical surfaces (8b, 8c) thereof, the shoulder (8a) being approximately flush with the inner end face of one (9a) of the inner rings (9, 9a) when the connection is in unclamped condition;

and a ring-shaped disengagement disk (3) of non-yielding material located intermediate said inner rings and seating against said shoulder (8a) and against the end face of said one inner ring (9a), said disk (3), being apertured to freely pass said bolts (5) into their engagement holes and against which the bolts (5) thrust to disengage said rings (2, 2a).

9. Connection according to claim 8, wherein said disk is a steel disk.

10. Connection according to claim 8, wherein the cone angles of said surfaces are different, the surface with the self-binding characteristics having a self-binding cone angle ($\beta$) and the surface which is non-self-binding having a greater cone angle ($\alpha$).

11. Connection according to claim 8, wherein the friction engagement surface characteristics of said self-binding and non-self-binding surfaces are different.

12. Connection according to claim 1, wherein the shoulder (1a) is approximately flush with the inner end face of the outer ring having the non-self-binding surface (1c).

13. Connection according to claim 6, wherein the shoulder (1a) is approximately flush with the inner end face of the outer ring having the non-self-binding larger cone angle ($\alpha$).

14. Connection according to claim 8, wherein the shoulder (8a) is approximately flush with the inner end face of the inner ring having the non-self-binding surface (8c).

15. Connection according to claim 10, wherein the shoulder (8a) is approximately flush with the inner end face of the inner ring having the non-self-binding larger cone angle (a).

* * * * *